United States Patent [19]

Shamshoum

[11] Patent Number: 5,256,392
[45] Date of Patent: Oct. 26, 1993

[54] MODIFIED ZEOLITE BETA METHOD OF PREPARATION

[75] Inventor: Edwar S. Shamshoum, Houston, Tex.

[73] Assignee: Fina Technology, Inc., Dallas, Tex.

[21] Appl. No.: 371,501

[22] Filed: Jun. 23, 1989

[51] Int. Cl.$^5$ ............................................. C01B 33/34
[52] U.S. Cl. ..................................... 423/717; 502/64; 502/86; 423/DIG. 27
[58] Field of Search ............... 423/328 EX, DIG. 27, 423/717; 502/64, 86

[56] References Cited

U.S. PATENT DOCUMENTS

| | | | |
|---|---|---|---|
| 3,308,069 | 3/1967 | Wadlinger | 423/328 |
| 3,929,672 | 12/1975 | Ward | 502/66 |
| 4,185,040 | 1/1980 | Ward et al. | 585/467 |
| 4,269,815 | 5/1981 | Lim et al. | 423/328 |
| 4,570,027 | 2/1988 | Boucher et al. | 585/467 |
| 4,642,226 | 2/1987 | Calver et al. | 423/329 |
| 4,788,169 | 11/1988 | Degman, Jr. et al. | 502/64 |

FOREIGN PATENT DOCUMENTS

| | | |
|---|---|---|
| 159846 | 10/1985 | European Pat. Off. |
| 164939 | 12/1985 | European Pat. Off. |
| 186447 | 7/1986 | European Pat. Off. |
| 272830 | 6/1988 | European Pat. Off. |

*Primary Examiner*—Michael Lewis
*Assistant Examiner*—Stuart L. Hendrickson
*Attorney, Agent, or Firm*—Joe S. Schaper; John K. Abokhair; M. Norwood Cheairs

[57] ABSTRACT

The modified zeolite beta has a surface area based upon the crystalline structure of the zeolite beta of at least 600 m$^2$/g and a sodium content in the crystalline structure of the zeolite beta of less than 0.04 wt % Na$_2$O.

A process for modifying an alkali metal containing zeolite beta synthesized by the hydrothermal digestion of a reaction mixture containing an organic templating agent. The as synthesized zeolite beta is treated with an ion exchange medium then calcined at a temperature within the range of 400°–700° C. for a period of two hours or longer. The calcined zeolite beta is again treated with an ion exchange medium to protonate additional active sites by exchanging alkali metal ions. The ion exchanged zeolite from this step is mixed with a binder to produce a mulled zeolite-binder mixture pelletized by extrusion.

5 Claims, No Drawings

MODIFIED ZEOLITE BETA METHOD OF PREPARATION

TECHNICAL FIELD

This invention relates to a modified zeolite beta and its preparation and more particularly to a modified zeolite beta in which the zeolite, in its synthesized form, is treated in order to arrive at a molecular sieve zeolite having high surface area and low sodium content.

BACKGROUND OF THE INVENTION

Zeolite beta is a crystalline aluminosilicate molecular sieve zeolite which finds application in a number of industrial processes including as a catalyst in various hydrocarbon conversion reactions such as hydrocracking, hydroisomerization and dewaxing. Zeolite beta, like many other molecular sieve zeolites, is synthesized by the hydrothermal digestion of a reaction mixture comprising silica, alumina, an alkali alkaline earth metal and an organic templating agent. The organic agent acts as a template in the nucleation and growth of the zeolite beta crystals. Once the crystals are formed, it is conventional practice to carry out a calcination treatment in order to remove the organic material from the interstitial channels of the molecular sieve network.

Crystalline zeolite beta, which is identified by its x-ray defraction pattern, and basic procedures for its preparation are disclosed in U.S. Pat. No. 3,308,069 to Wadlinger et al. The chemical composition of zeolite beta in the as synthesized form as disclosed in the patent to Wadlinger et al. may be characterized as follows:

Wherein:
X is less than 1,
m is at least one cation, usually an alkali metal or alkaline earth metal, more specifically sodium,
n is the valance of M, Y is from about 5 to 100,
W is about 4, and
TEA represents the tetraethylammonium ion.

As described in Wadlinger et al., zeolite beta may be formed from a mixture in water of tetraethylammonium hydroxide and suitable sources of sodium monoxide (or hydroxide), alumina, and silica. Typical reaction mixture compositions, in terms of mole ratios, fall within the following ranges:

$SiO_2/Al_2O_3$—from about 10 to about 200
$Na_2O$/tetraethyiammonium hydroxide (TEAOH)—from about 0–0.1
TEAOH/$SiO_2$— from about 0.1–1.0
$H_2O$/TEAOH— from about 20 to about 75

The resulting reaction mixture can be heated at a temperature of about 75° to about 200° C. until crystallization of the molecular sieve zeolite occurs. The crystallized product can be separated from the reaction mixture by filtration or centrifuging and then washed with water and dried to remove water from the molecular sieve network. The product can then be calcined in air or in an inert atmosphere in order to remove the templating agent as described above.

The Wadlinger patent discloses that the catalytic materials can be prepared by calcining the original sodium form of the zeolite beta and/or replacing the major portion of the sodium ions with other metallic or ammoniacal ions. Specifically disclosed in Wadlinger (Example 2) is a composition containing after calcination in air at 55° C., 0.7 mole percent $Na_2O$. Disclosed in Example 8 is a product formed by treating a dried product which was exchanged continuously for 48 hours with 2% solution of ammonium chloride. After washing free of excess chloride ions, the catalyst was dried and calcined for 3 hours at 1000° F. to produce an acid beta aluminosilicate having 0.07% Na content.

Various other procedures are known for the synthesis of zeolite beta. For example, European Patent Application 159,846 to Rubin discloses the synthesis of zeolite beta having a silica/alumina mole ratio of up to 300 employing a templating agent formed by the combination of dimethylbenzylamine and benzyl halide. The hydrothermal digestion procedure in which the crystals are formed is carried out at a temperature below 175° C. in order to avoid the formation of undesirable side effects. The zeolite beta, produced in accordance with the Rubin application, when employed either as an absorbent or a catalyst, can be at least partially dehydrated by heating at a temperature of about 200°–600° C. in an air or nitrogen atmosphere for about 1–48 hours. The inorganic cations of freshly synthesized zeolite beta can be decomposed by heating to a temperature up to about 550° C. for 1–48 hours. Zeolite beta prepared in accordance with the Rubin process can have the original cations associated therewith replaced by a wide variety of other cations including hydrogen, ammonium and metal cations and mixtures thereof.

European Patent Application 165,208 by Bruce et al. discloses a procedure for the preparation of zeolite beta, similar to that disclosed in the aforementioned Rubin application except that the templating agent is a dibenzyl dimethyl ammonium halide or hydroxide with the silica/alumina components employed to provide a silica/alumina mole ratio in the synthesized product of about 20–250.

U.S. Pat. No. 4,642,226 to Calvert et al. discloses a process for the preparation of zeolite beta which is similar to those disclosed in the aforementioned European patent applications and which employs dibenzil dimethylammonium hydroxide or chloride as a templating agent. The reaction mixture in Calvert is heated at a temperature of about 80° to about 175° C. for about 1 to about 120 days. The Calvert patent states that the zeolite beta can be used in either in the organic nitrogen-containing an alkali metal containing form, the alkali metal form and hydrogen form or another univalent or multivalent cationic form. Calvert also discloses that zeolite beta can be used in intimate combination with a metallic component, e.g., a hydrogenation component such as tungsten, vanadium, molybdenum, rhenium, nickel, cobalt, chromium, manganese or a noble metal such as platinum or palladium. The patent further states that the zeolite beta should be at least partially dehydrated when employed either as an absorbent or as a catalyst or as a hydrocarbon conversion catalyst. Chlorides, nitrates and sulfates are disclosed as ion exchange agents. Calvert et al. discloses zeolite beta of relatively low sodium contents, e.g., 0.14 wt. % Na and 0.11 wt. % Na.

In another process for the preparation of zeolite beta, is disclosed European Patent Application 164939 to Calvert. The synthesis procedures disclosed here are similar to those in the above-mentioned references, except that a tetraethylammonium bromide or hydroxide templating agent is employed to produce a partially crystalline product of extremely high silica/alumina ratio which is said to be less expensive than fully crystalline zeolite beta which is dealuminized to provide a corresponding silica/alumina mole ratio. The digestion period in this procedure is for a period of about 1-7 days at a temperature of 90°-200° C. The silica/alumina ratio of the zeolite beta produced here ranges from 20-1000 and is preferably greater than 200.

European Application 186,447 by Kennedy et al. discloses the use of zeolite beta in catalytic cracking processes. The zeolite beta may be used in the as synthesized form following calcination of and be of either low or high silica/alumina activities. It may be synthesized with trivalent framework ions other than aluminum to form, for example, borosilicates, boroaluminosilicates, gallosilicates, or galloaluminosilicates structural isotypes, which are considered to constitute forms of zeolite beta. The zeolite beta may be acid extracted to form the high silica/alumina products.

As noted previously, the Wadlinger et al. and Calvert et al. patents disclose zeolite beta of relatively low sodium content, although they attribute no particular advantage to this characteristic. The use of certain zeolites of moderate but not extremely low sodium content as molecular sieve catalysts in hydrocarbon conversion processes is known in the art. U.S. Pat. No. 4,185,040 to Ward et al. discloses an alkylation process employing a zeolite catalyst of low sodium content which is said to be especially useful in the production of ethylbenzene from benzene and ethylene and cumene from benzene and propylene. The $Na_2O$ content should be less than 0.7 wt. % and preferably less than 0.5 wt. %. Examples of suitable zeolites include molecular sieves of the X, Y, L, B, ZSM-5, and omega crystal types with steam stabilized hydrogen Y zeolite being preferred. Specifically disclosed is a steam stabilized ammonium Y zeolite containing about 0.2 $Na_2O$.

Another alkylation procedure is disclosed in European Patent Application 272,830 to Ratcliffe et al. Ratcliffe procedure involves the use of alkylation catalysts which have been treated in a manner to improve selectivity to monoalkylation in an aromatic alkylation procedure, specifically the propylation of benzene to produce cumene. The selectivity of the molecular sieve containing alkylation catalyst is said to be increased by at least one percentage point by first depositing a carbonaceous material on the catalyst and then subjecting the resultant carbon containing catalyst particles to combustion. Specifically disclosed zeolitic crystalline molecular sieves include those selected from the group of Y zeolites, fluorided Y zeolites, X zeolites, zeolite beta, zeolite L and zeolite omega. The zeolites may be modified products of reduced alumina content and reduced sodium content. A preferred zeolite is Y zeolite produced by first ammonium exchanging to produce an ammonium exchanged zeolite of a sodium content of about 0.6 wt. %, expressed as $Na_2O$, calcining at a temperature of about 315°-900° C. in the presence of steam, and then ammonium exchanging the steamed calcined zeolite to obtain a product having less than 1.0 wt. % and preferably less than about 0.2 wt. % sodium expressed as $Na_2O$.

SUMMARY OF THE INVENTION

In accordance with the present invention there is provided a modified molecular sieve comprising hydrogen zeolite beta of high surface area and low content of sodium or other alkali metal which is of a good activity and aging quality when used as a catalyst in hydrocarbon conversion reactions. Also, provided in accordance with the present invention is a process of producing such modified zeolite beta.

In one aspect of the present invention, the modified zeolite beta has a surface area based upon the crystalline structure of the zeolite beta of at least 600 $m^2/g$ and preferably at least 650 $m^2/g$. A specific aspect of the invention provides a molecular sieve in which the hydrogen zeolite beta is in combination with a binder and in which the surface area of the zeolite beta, based upon the molecular sieve and the binder, is at least 450 $M^2/g$.

In a further aspect of the invention, there is provided a hydrogen zeolite beta having a sodium content in the crystalline structure of the zeolite beta of less than 0.04 wt % $Na_2O$. Preferably the sodium content is less than 0.02 wt % $Na_2O$.

In another aspect of the present invention, there is provided a process for the preparation of a hydrogen zeolite beta derived by modification of an alkali metal containing zeolite beta synthesized by the hydrothermal digestion of a reaction mixture containing an organic templating agent. The synthesized zeolite beta may be produced by any suitable technique, such as described in the aforementioned references. In carrying the process, the synthesized zeolite beta is treated with an ion exchange medium in order to protonate at least a portion of the active sites of the zeolite by exchanging off alkali metal ions. The ion exchanged zeolite is then calcined at a temperature within the range of 400°-700° C. for a period of at least two hours, preferably within the range of 2-10 hours. The calcined zeolite beta is then again treated with an ion exchange medium to protonate an additional portion of the active sites by exchanging off additional alkali metal ions. The ion exchanged zeolite from this step is mixed with a binder to produce a mulled zeolite-binder mixture. This mixture is pelletized by extrusion or any other suitable technique and the resulting pellets are then dried.

In a preferred embodiment of the invention, the ion exchange treatment steps are accomplished by repeated submersions of the zeolite beta in an ion exchange medium comprising an aqueous solution of ammonium salt. In a further aspect of the invention, the intermediate calcination step between the ion exchange treatment steps is carried out under time and temperature conditions sufficient to arrive at a surface area based upon the crystalline structure of the zeolite beta which has at least twice the surface area of the zeolite beta in the as synthesized form.

DETAILED DESCRIPTION OF THE INVENTION

In carrying out the present invention, as synthesized zeolite beta is subjected to a plurality of sequential ion exchange and calcination treatments to arrive at a molecular sieve product of extremely low sodium content, substantially below the sodium content of the acid zeolite beta produced in accordance with the patent to Wadlinger as described above. In addition, the final molecular sieve product has a substantially higher surface area than that heretofore attained for zeolite beta. The invention involves an initial ion exchange treatment of the as synthesized zeolite beta followed by calcination, followed by subsequent ion exchange to arrive at a product of ultralow sodium content, and as noted above, high surface area.

While the invention is not to be limited by theory, it is believed the initial ion exchange treatment removes a substantial portion of the sodium or other alkali metal ions incorporated during synthesis, such that the subsequent calcination procedure, carried out under essentially anhydrous conditions, does not lead to collapse or otherwise undesirable changes in the crystal structure of the zeolite beta. This calcination procedure, together with the initial ion exchange treatment, preferably results in at least a twofold increase in the zeolite beta surface area over the surface area of the zeolite in the as synthesized form.

The intermediate calcination step is effective to decompose the organonitro templating agent within the pore network of the zeolite beta and opens up the molecular sieve channels so that they are readily susceptible to subsequent ion exchange treatment. After the initial calcination step, an ion exchange treatment is again carried out in order to protonate an additional portion of the active sites in the zeolite by exchanging off sodium or other alkali metal ions. This second ion exchange treatment results in a zeolite beta of extremely low sodium content, less than 0.04 wt. % $Na_2O$, and high surface area, at least 600 $m^2/g$ based upon the zeolite beta crystalline structure. The preferred ion exchange medium is an ammonium salt. The zeolite beta resulting from the second ion exchange treatment is mixed with a binder, pelletized and dried and then subjected to another calcination step in order to convert the ammonium exchanged active sites to acidic ($H^+$) active sites.

As synthesized zeolite beta used as a starting material for the present invention can be synthesized by the hydrothermal digestion of silica, alumina, or sodium and other alkyl metal oxide, and an organic templating agent in accordance with any suitable procedure such as those disclosed in the aforementioned U.S. Patents to Wadlinger et al. and Calvert et al. and the aforementioned European patent applications.

Typical digestion conditions include temperatures ranging from slightly below the boiling point of water to about 170° C. at pressures equal to or greater than the vapor pressure of water at the temperature involved. The resulting reaction mixture should be maintained under mild agitation, such as by stirring, for periods ranging from about 1 day to several months to achieve the desired degree of crystallization to form the zeolite product. Lower temperatures will normally require longer periods in order to arrive at the desired crystal formation. For example, at temperatures of about 100° C. crystal growth may occur during periods ranging from about 1 month to 4 months, whereas at temperature near the upper end of the aforementioned range, e.g., about 160° C., the digestion period may be from 1 or 2 days up to about 1 week. At intermediate temperatures of about 120°-140° C., the digestion period may be for several weeks, perhaps 2-4 weeks.

Any suitable templating agent may be used in forming the zeolite beta molecular sieve crystalline structure and, as indicated by the references referred to above, appropriate templating agent include tetraethylammonium hydroxide and halides such as tetraethylammonium chloride and dibenzyl dimethyl-ammonium, hydroxide or halide such as dibenzyl dimethyl ammonium chloride. The reaction components may be varied in accordance with techniques well known in the art to provide the zeolite beta product of varying silica/alumina ratios. Typically, the reaction mixture used to synthesize the zeolite beta molecular sieve will contain formulations within the following mole ratio ranges:

$SiO_2/Al_2O_3$: 20-1000
$H_2O/SiO_2$: 5-200
$OH^-/SiO_2$: 0.1-0.2
$M/SiO_2$: 0.01-1.0
$R/SiO_2$: 0.1-2.0

R is the nitroorgano templating agent, e.g., a tetraethylammonium group and M is an alkali metal ion, usually but not necessarily sodium. For a further description of zeolite beta and methods for its synthesis, recourse may be had to the above patents and patents applications including, specifically, U.S. Pat. Nos. 3,308,069 (Wadlinger et al.) and 4,642,226 (Calvert et al.), the entire disclosures of which are incorporated herein by reference.

As explained above, a critical first step in carrying out the method of present invention lies in treating the as synthesized zeolite beta with an ion exchange medium prior to high temperature calcination which is designed to remove a predominant portion of the templating agent from the intercrystalline molecular sieve network. The product, at the conclusion of the hydrothermal digestion procedure leading to crystallization of the zeolite beta, can be washed and dried at temperature sufficient to, usually substantially less than 200° C., e.g., about 150° C., designed to remove water from the product including dehydrating the product of water retained within the intercrystalline pores. However, higher calcination temperatures, typically on the order of 400° C. or above, which lead to the decomposition of the templating agent should be avoided at this stage of the process.

The ion exchange medium may include any suitable agent effective to protonate active sites in the molecular sieve structure by exchanging the sodium or other alkaline metal ions incorporated during the crystallization procedure. Ammonium salts, as described in detail below, are the preferred ion exchange agents and the invention will be described in detail with reference to the use of such ion exchange agents. However, it should be recognized that other ion exchange agents compatible with acidifying the active sites in the molecular sieve network can be used in carrying out the invention. For example, ion exchange can be accomplished using aqueous solutions of mineral acids, such as hydrochloric acid, nitric acid, or sulfuric acid or low molecular weight organic acids such as formic, acetic, or propionic acid. The use of acids, particularly the strong mineral acids, may be undesirable in preparing and modifying the zeolite beta for certain applications in that dealumination of the zeolite may result. In addition, organic salts, such as ammonium acetate and primary, secondary or tertiary amine salts such as incorporating low molecular weight alkyl substituents such as methyl and ethyl groups, may be employed. Examples of such amine salts include alkyl ammonium chlorides and nitrates such as ethyl ammonium nitrate, methyl ammonium nitrate, trimethyl ammonium nitrate and like amine salts may be employed. Also included as ion exchange agents are quaternary ammonium salts based again on low molecular weight alkyl groups.

As noted previously, normally inorganic ammonium salts, such as ammonium nitrate, ammonium sulfate, ammonium carbonate, or ammonium chloride, will be used as the ion exchange agent. Ammonium nitrate is particularly preferred since upon heating, subsequent to the ion exchange step, it decomposes to ammonia and nitric acid which, in turn, produces water and nitrogen oxides which evolve from the catalyst product. A salt such as ammonium sulfate is usually less advantageous because of its substantially higher decomposition temperature relative to ammonium nitrate. Also, in some cases the sulfur may incorporated into the molecular sieve framework replacing framework oxygen.

Preferably, the initial ion exchange treatment is carried out in two discrete steps each involving submersing the zeolite beta in fresh ion exchange solutions. During the first and preferably during both ion exchange steps, the zeolite beta remains submersed in the medium until the exchange systems approaches equilibrium between the ammonium and sodium (or other alkaline metal) ions. By way of example, employing a 2 normal ammonium nitrate solution, the zeolite beta may initially be submersed in the ion exchange solution for a period of about 1-5 hours at a temperature of 50°-90° C. Upon conclusion of the initial treatment the zeolite beta is withdrawn from the solution, washed with water and then submersed in a fresh solution of 2 normal ammonium nitrate. The time and temperature conditions here may be the same as for the first submersion.

At the conclusion of the initial ion exchange treatments, the ammonium exchanged zeolite beta is then subjected to a high temperature calcination treatment. The calcination treatment is carried out at a temperature and for a time sufficient to evolve at least a predominant portion, and preferably substantially all, of the templating agent from the interstitial pore spaces of the channels of the molecular sieve network. The calcination temperatures should be at least 400° C. It normally will be no more than 700° C., although higher temperatures can be employed. The calcination treatment should be normally carried out for a period of about 2-10 hours, although at higher temperatures, shorter periods of down to about 1 hour may be adequate. The calcination of treatment may extend beyond 10 hours, although there usually will be no reason for the longer calcination treatment. Preferably, the surface area at the conclusion of this calcination step is at least twice the surface area of the zeolite beta in the as synthesized form. As indicated by the example described below, three-fold or more increase in surface area can be achieved at the conclusion of the calcination step.

The initial calcination step is followed by a second ion exchange treatment which results in a further increase in surface area of the zeolite beta and a further decrease in the sodium, or other alkali metal, ion content. This post-calcination ion exchange treatment is, like the initial treatment, preferably carried out in two stages by twice submersing the zeolite beta within fresh ion exchange solutions. The time and temperature parameters employed in the second set of ion exchange treatments may be the same as those involved in the first ion exchange treatment.

At the conclusion of the second set of ion exchange treatments, the zeolite beta typically will have a surface area at least twice that of the original starting material and a very low sodium content of no more than 0.04 wt. % calculated as $Na_2O$ and usually less than 0.02 wt. % $Na_2O$.

Where the resulting zeolite beta is to be used as a catalyst it normally will be mixed with a binder such as alumina salt, gamma/alumina, or other refractory oxides to produce a mulled zeolite beta binder mixture. The mixture can then be pelletized by any suitable technique such as extrusion and the resulting pellets then dried. At this point, the pelletized binder zeolite product is calcined under conditions sufficient to decompose the ammonium ions on the active site so the zeolite beta can arrive at the acid (H+) form. By way of example illustrating the present invention, an as synthesized zeolite beta having a silica/alumina ratio of about 20-50 and containing tetraethylammonium hydroxide as a retained templating agent was used as a starting material. The as synthesized zeolite beta had an initial surface area of 210 $M^2/g$ and a sodium content of about 0.5-1% $Na_2O$. The as synthesized zeolite beta was initially subjected an ammonium ion exchange treatment by submersing 100 grams of the catalyst in 1 liter of an aqueous solution of ammonium nitrate having a normality of 2. The zeolite beta was submersed in the ion exchange medium under mild agitation at 85° C. for a period of two hours. The zeolite beta was then separated from the ion exchange solution, washed and retreated with a fresh solution of 2 normal ammonium nitrate again at 85° C. for a period of two hours. The surface area at the conclusion of the second ammonium exchange step was 247 $M^2/g$ and the sodium content was less than 0.11.

The ammonium exchanged zeolite beta was then calcined at a temperature of about 560° C. for two hours. The surface area at the conclusion of the calcination step was 666 $M^2/g$.

After calcination, the exchanged and calcined zeolite beta was cooled and then subjected to a second ion exchange treatment involving a two-stage process, with each stage extending for two hours using the same ion exchange medium and under the same conditions as used during the initial treatment. At the conclusion of the third ammonium exchange procedure (the first stage of the second treatment), the surface area of the zeolite beta was further increased to 708 $M^2/g$. The surface area at the conclusion of the final ion exchange treatment was 815 $M^2/g$. The sodium content at the conclusion of the final ion exchange step was reduced to a value where it could not be measured using atomic absorption technique. Based upon this analysis, the $Na_2O$ content was substantially less than 100 ppm.

The ammonium zeolite beta was mulled with peptized alumina in a proportion of four parts zeolite beta to one part alumina binder. The resulting plastic zeolite binder mixture was extruded to form pellets having the size of about 1/16" and the resulting pellets were then calcined at 560° C. for two hours. The surface area of the final product, based upon the zeolite binder mixture, was 642 $M^2/g$.

Modified zeolite beta, produced in accordance with the present invention, can be used in various catalyst applications as indicated previously or in other applications, for example, such as selective absorbent. Where used as a catalyst, it may often times be desirable to incorporate a metal component into the zeolite beta, binder substrate. Suitable metal components includes those found in Groups VIB and VIII of the periodic table. Specific metals include chromium, molybdenum, tungsten, vanadium, iron, cobalt, nickel, copper, platinum and palladium.

The final product was used as a catalyst in experimental work involving the liquid phase alkylation of benzene with ethylene. In this experimental work, benzene and ethylene were mixed in a benzene/ethylene mole ratio of about 5 and supplied to a reactor containing a zeolite beta catalyst prepared in accordance with the procedure described above. The average reactor temperature was within the range of 200°-250° C. and the reactor pressure was about 400-500 psig over the life of the experimental run. The catalyst showed good selectivity to ethylbenzene with little evidence of aging over a period of about 20 days. Xylene production during this period was negligible.

Having described specific embodiments of the present invention, it will be understood that modification thereof may be suggested to those skilled in the art, and it is intended to cover all such modifications as fall within the scope of the appended claims.

I claim:

1. In a process for the preparation of a hydrogen zeolite beta derived by modification of sodium zeolite beta synthesized by the hydrothermal digestion of a reaction mixture comprising silica, alumina, sodium oxide and an organic templating agent, the steps comprising:
  (a) treating said synthesized zeolite beta with an ion exchange medium comprising an aqueous solution of an ammonium salt to exchange a portion of the active sites in said zeolite beta by replacing sodium with ammonium ions;
  (b) calcining under anhydrous conditions said ion exchanged zeolite beta at a temperature and for a period of time sufficient to remove at least a portion of the templating agent from said zeolite and arrive at a surface area based upon the crystalline structure of said zeolite beta which is at least twice the surface area of said zeolite beta in the as synthesized form;
  (c) treating said calcined zeolite with an ion exchange medium comprising an aqueous solution of an ammonium salt to exchange another portion of the active sites in said zeolite beta by replacing sodium with ammonium ions;
  (d) mixing said ion exchanged zeolite from step (c) with a binder to produce a mulled zeolite/binder mixture;
  (e) pelletizing said zeolite/binder mixture and drying the resulting pellets;
  (f) calcining said pellets at a temperature and for a time sufficient to decompose ammonium ions on the active sites of said zeolite to hydrogen.

2. The method of claim 1 wherein the treating step of step (a) is carried out by contacting said synthesized zeolite beta with an ion exchange with said ion exchange medium for a period of at least two hours.

3. The method of claim 2 wherein said treating step (a) comprises submersing said synthesized zeolite beta in a first portion of said ion exchange medium for a period of at least one hour, separating said zeolite beta from said first portion of said ion exchange medium, and submersing said separated zeolite beta in a second portion of said ion exchange medium for a period of at least one hour.

4. The method of claim 3 wherein the calcination wherein said calcination step (b) is carried out at a temperature within the range of 400°-700° C.

5. The method of claim 4 wherein the calcination of step (f) is carried out at a temperature in the range of 400°-700° C.

* * * * *